Oct. 22, 1946.  W. F. DONKIN  2,409,841
STORAGE BATTERY
Filed June 7, 1943

INVENTOR.
WILLIAM F. DONKIN
BY
Kwis Hudson Boughton & Williams
ATTORNEYS

Patented Oct. 22, 1946

2,409,841

UNITED STATES PATENT OFFICE 2,409,841

STORAGE BATTERY

William F. Donkin, Cleveland Heights, Ohio, assignor to Willard Storage Battery Company, Cleveland, Ohio, a corporation of West Virginia Application June 7, 1943, Serial No. 489,900

5 Claims. (Cl. 136—6)

This invention relates to storage batteries and particularly to storage batteries of the flashlight type which have a terminal at the top and a terminal, usually a lead terminal, at the bottom. As will be explained presently, the terminal, which is usually placed at the bottom of the battery, may be otherwise located, as, for example, at the side thereof, but it will be referred to herein as the bottom terminal.

One of the objects of the present invention is to eliminate the necessity of running a conductor from the top strap connected to the negative plates to the bottom terminal either on the inside or on the outside of the container.

I accomplish this object by providing on one of the negative plates at the bottom thereof a lug similar to the lug at the top of the plate which is lead-burned to the strap connecting all of the negative plates, and I attach the bottom lug to the bottom terminal in any suitable manner, as by lead-burning.

The negative plate having the bottom lug may be made of heavier construction than the remainder of the negative plates so as to provide increased current carrying capacity. Generally this bottom lug is located centrally of the plate and the increased current carrying capacity is obtained by making the central vertical rib of the grid of the plate of heavier construction than the remainder of the vertical ribs.

The invention may be further briefly summarized as consisting in certain novel details of construction and combinations and arrangements of parts which will be described in the specification and set forth in the appended claims.

In the accompanying sheet of drawing illustrating the invention,

Figure 3:
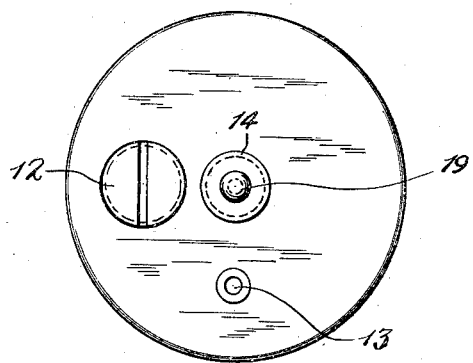
Fig. 3 is a top plan view of the battery.
Figure 5:
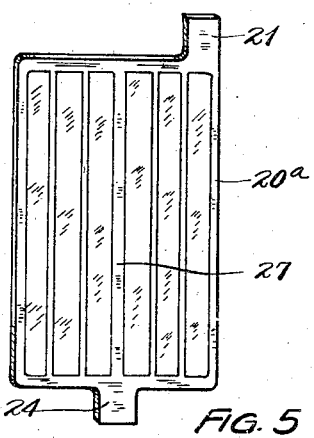
Fig. 5 is a perspective view of the negative plate showing the top lug and the bottom lug.
Figure 2:
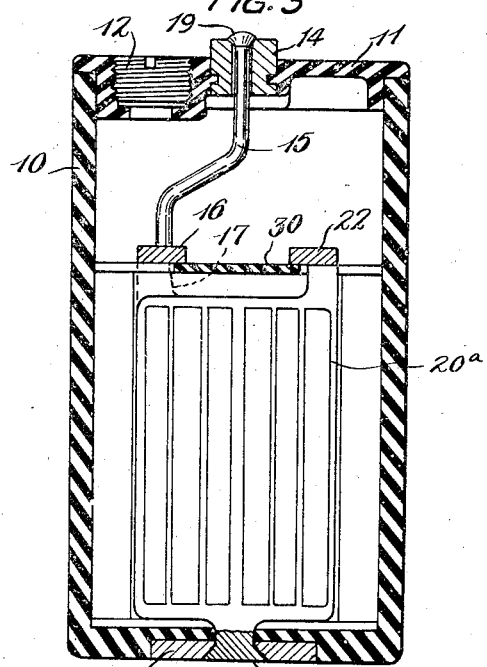
Fig. 2 is a longitudinal sectional view showing the completed battery.
Figure 1:
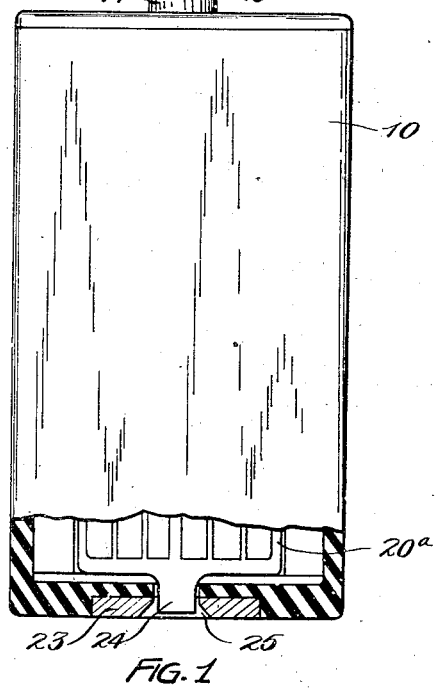
Fig. 1 is a side view of a battery with the bottom broken away to show the bottom lug of the negative plate before it is attached to the bottom terminal.
Figure 4:
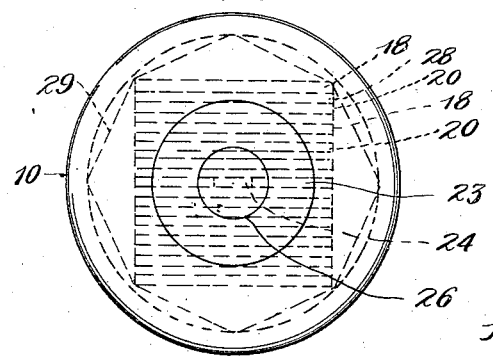
Fig. 4 is a bottom view of the same.

Referring now to the drawing, 10 represents the casing which is formed of suitable insulating material, such as polystyrene. The casing has a cover 11 of similar material which is provided with a removable filler plug 12, a vent tube 13, and a central positive terminal 14. This terminal 14 is connected to a connector 15 which at its lower end is suitably connected, as by lead-burning, to the strap 16 to which are lead-burned the lugs 17 of the several positive plates 18. In the embodiment shown, the connector 15 passes through the lead terminal member 14 located in the cover 11 and is lead-burned at the top thereof as at 19.

The negative plates 20 have top lugs 21 which are lead-burned to a strap 22. It is to be noted that there is no conductor or connector extending from the strap 22 to the bottom terminal 23 which in this instance is in the form of a disk fitted into a recess in the bottom of the container 10 and generally formed of lead. I avoid the necessity for such a conductor or connector by providing on one of the negative plates, designated 20a and which is generally the central negative plate, a bottom lug 24 which extends through the bottom of the container and is suitably connected to the bottom terminal 23. In this instance the lead terminal has a central recess or opening 25 and the bottom lug 24 is lead-burned to the bottom terminal as shown at 26. Generally it is desired that the negative plate 20a have increased current carrying capacity over that which it would normally have and over that of the other negative plates, and while this may be accomplished by making the complete grid of the plate of heavier construction, in this instance the central rib of the grid which is in line with the bottom lug 24 and is designated 27 is made heavier than the other ribs.

By eliminating the necessity of running a conductor from the top strap 22 to the bottom terminal 23, either inside or outside of the container, and by providing one of the negative plates with a lug 24 which is lead-burned to the bottom terminal, I have greatly simplified the construction and have eliminated a part which is frequently the source of trouble.

It will be understood that the positive and negative plates will be separated by insulators 28, and, if desired, the element of the battery within the upright wall of the container may be held centrally therein by a liner 29 which may be molded from insulating material. At the top of the liner there is preferably provided a slotted baffle 30 which serves as a holddown for the liner 29 and for the battery element.

It is not necessary that the container be round in cross-section as it may be square or oblong in shape. Furthermore, whether or not the container is round in cross-section, it may be desirable to place the lead terminal 23 at the side of the container, in which event the plate 20a will have a lug located not at the bottom thereof but appropriately located at the side thereof for connection with the side terminal. In that case the plate which has the side lug can be made somewhat heavier than the remainder of the plates.

This application covers a modification of the construction shown in the John R. Smyth application Serial No. 486,819, filed May 13, 1943, and in the Koenig et al. application Serial No. 486,820, filed May 13, 1943, now Patent No. 2,387,590 issued October 23, 1945.

While I have shown the preferred construction, I do not desire to be confined to the precise details shown and described but aim in my claims to cover all modifications which do not involve a departure from the spirit and the scope of the invention.

Having thus described my invention, I claim:

1. In a storage battery, a container, groups of positive and negative plates arranged substantially in parallelism in the container, the plates of both groups having at their upper ends lugs to which straps are connected, a terminal at the top of the battery, a connector connected to the strap connecting the plates of one polarity and to the terminal at the top of the battery, one of the plates of the opposite polarity having a bottom lug, and a bottom terminal connected to said bottom lug.

2. In a storage battery, a container, groups of positive and negative plates arranged substantially in parallelism in the container, the plates of both groups having at their upper ends lugs to which straps are connected, a terminal at the top of the battery, a connector connected to the strap connecting the plates of one polarity and to the terminal at the top of the battery, one of the plates of the opposite polarity having a bottom lug, and a bottom terminal connected to said bottom lug, the plate having the bottom lug having greater current carrying capacity than the remaining plates of like polarity.

3. In a storage battery, a container, groups of positive and negative plates arranged substantially in parallelism in the container, the plates of both groups having at their upper ends lugs to which straps are connected, a terminal at the top of the battery, a connector connected to the strap connecting the plates of one polarity and to the terminal at the top of the battery, one of the plates of the opposite polarity having a bottom lug, and a bottom terminal connected to said bottom lug, the grid of the plate having the bottom lug being provided in line with the bottom lug with a rib of heavier construction than the remaining ribs of the grid.

4. In a storage battery, a container, a battery element composed of groups of positive and negative plates, each of the groups of plates having at the top lugs which are connected to a strap, one of the negative plates having a lug at the bottom, and a bottom terminal connected to said bottom lug.

5. In a storage battery, a container, groups of positive and negative plates arranged substantially in parallelism in the container, the plates of both groups having at their upper ends lugs to which straps are connected, a centrally located top terminal, a connector connected to the strap connecting the plates of one polarity and to the terminal at the top of the battery, one of the plates of opposite polarity having a bottom lug, and a centrally located bottom terminal connected to said bottom lug.

WILLIAM F. DONKIN.